United States Patent
Bancel et al.

(10) Patent No.: US 8,412,996 B2
(45) Date of Patent: Apr. 2, 2013

(54) METHOD AND DEVICE FOR CHECKING THE INTEGRITY OF A LOGIC SIGNAL, IN PARTICULAR A CLOCK SIGNAL

(75) Inventors: Frederic Bancel, Lamanon (FR); Nicolas Berard, Trets (FR); Philippe Roquelaure, Bouc Bel Air (FR)

(73) Assignee: STMicroelectronics SA, Montrouge (FR)

( * ) Notice: Subject to any disclaimer, the term of this patent is extended or adjusted under 35 U.S.C. 154(b) by 1346 days.

(21) Appl. No.: 12/020,812

(22) Filed: Jan. 28, 2008

(65) Prior Publication Data

US 2008/0208497 A1    Aug. 28, 2008

(30) Foreign Application Priority Data

Jan. 29, 2007   (FR) ...................... 07 00594

(51) Int. Cl.
G06F 11/00 (2006.01)
G06K 5/04 (2006.01)
G11B 5/00 (2006.01)
G11B 20/20 (2006.01)
G11B 27/00 (2006.01)
G01R 31/28 (2006.01)
H03M 13/00 (2006.01)
H04L 7/00 (2006.01)

(52) U.S. Cl. .......... 714/744; 714/55; 714/700; 714/707; 714/731; 714/743; 714/798; 714/814; 714/775

(58) Field of Classification Search ........................ None
See application file for complete search history.

(56) References Cited

U.S. PATENT DOCUMENTS 5,619,155 A    4/1997 Wang ........................... 327/142

FOREIGN PATENT DOCUMENTS

EP    1 054 345    11/2000
GB    2 347 566    9/2000

*Primary Examiner* — Guerrier Merant
(74) *Attorney, Agent, or Firm* — Seed IP Law Group PLLC

(57) ABSTRACT

A device and a method detect an acceleration of a logic signal expressed by a closeness, beyond a closeness threshold, of at least two variation edges of the logic signal. A first control bit and a second control bit are provided. At each edge of the logic signal, the value of the first control bit is inverted after a first delay and the value of the second control bit is inverted after a second delay. An acceleration is detected when the two control bits have at the same time their respective initial values or their respective inverted initial values. Application is in particular but not exclusively to the detection of error injections in a secured integrated circuit.

26 Claims, 9 Drawing Sheets

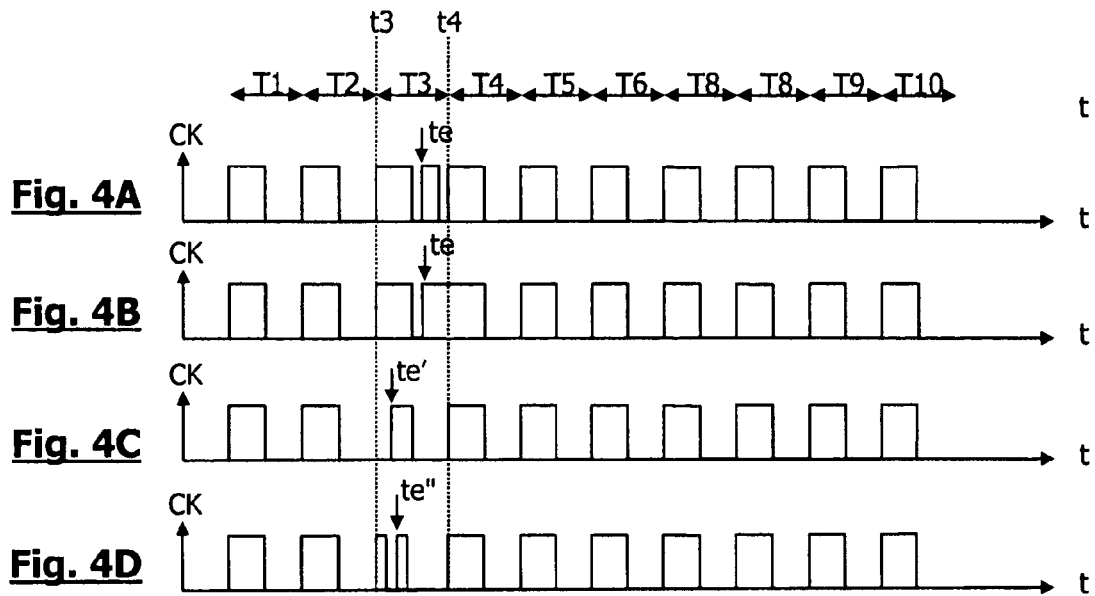
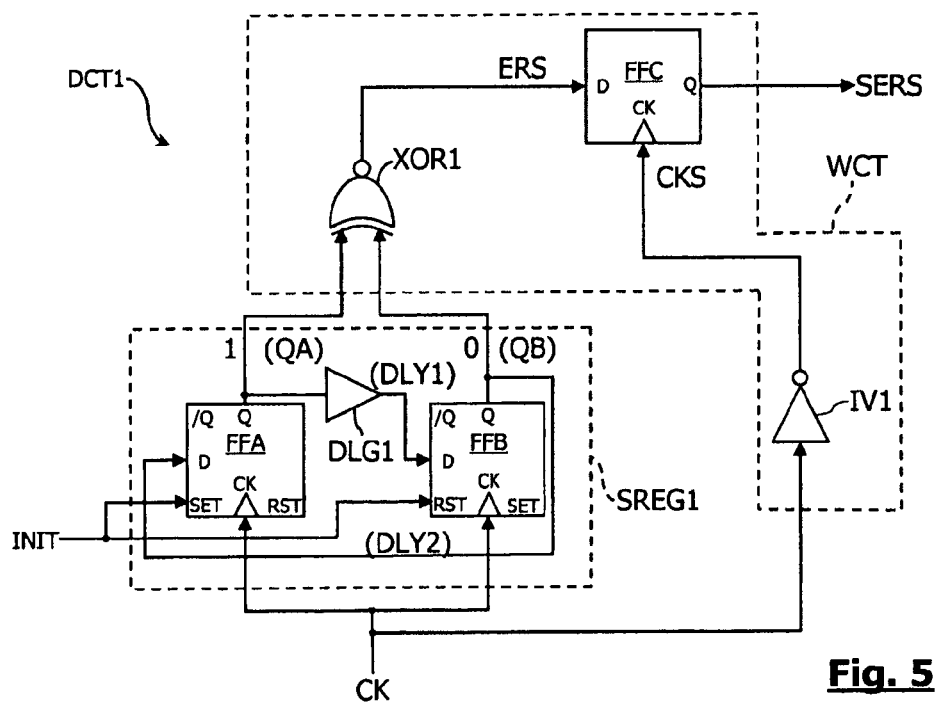

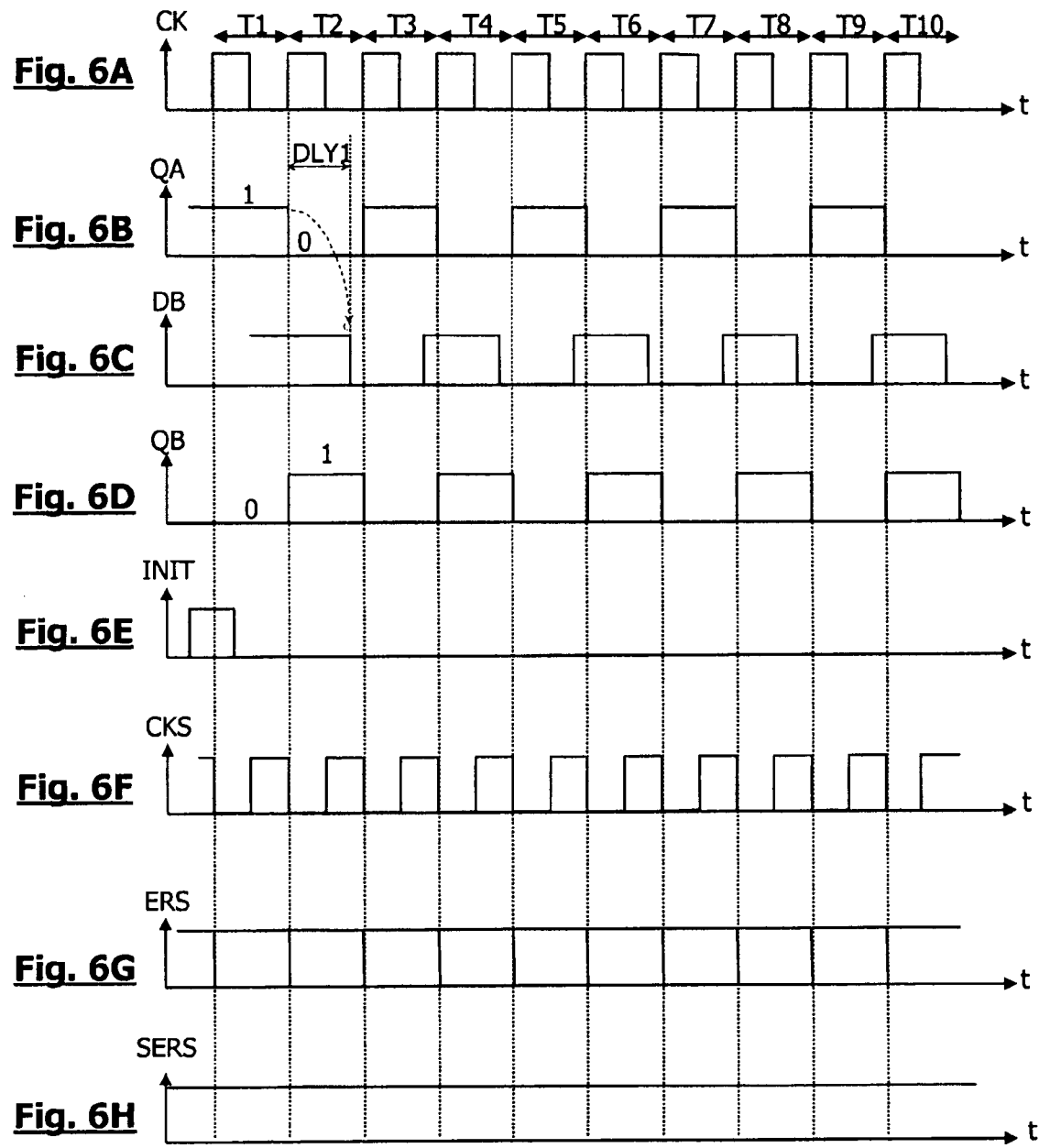

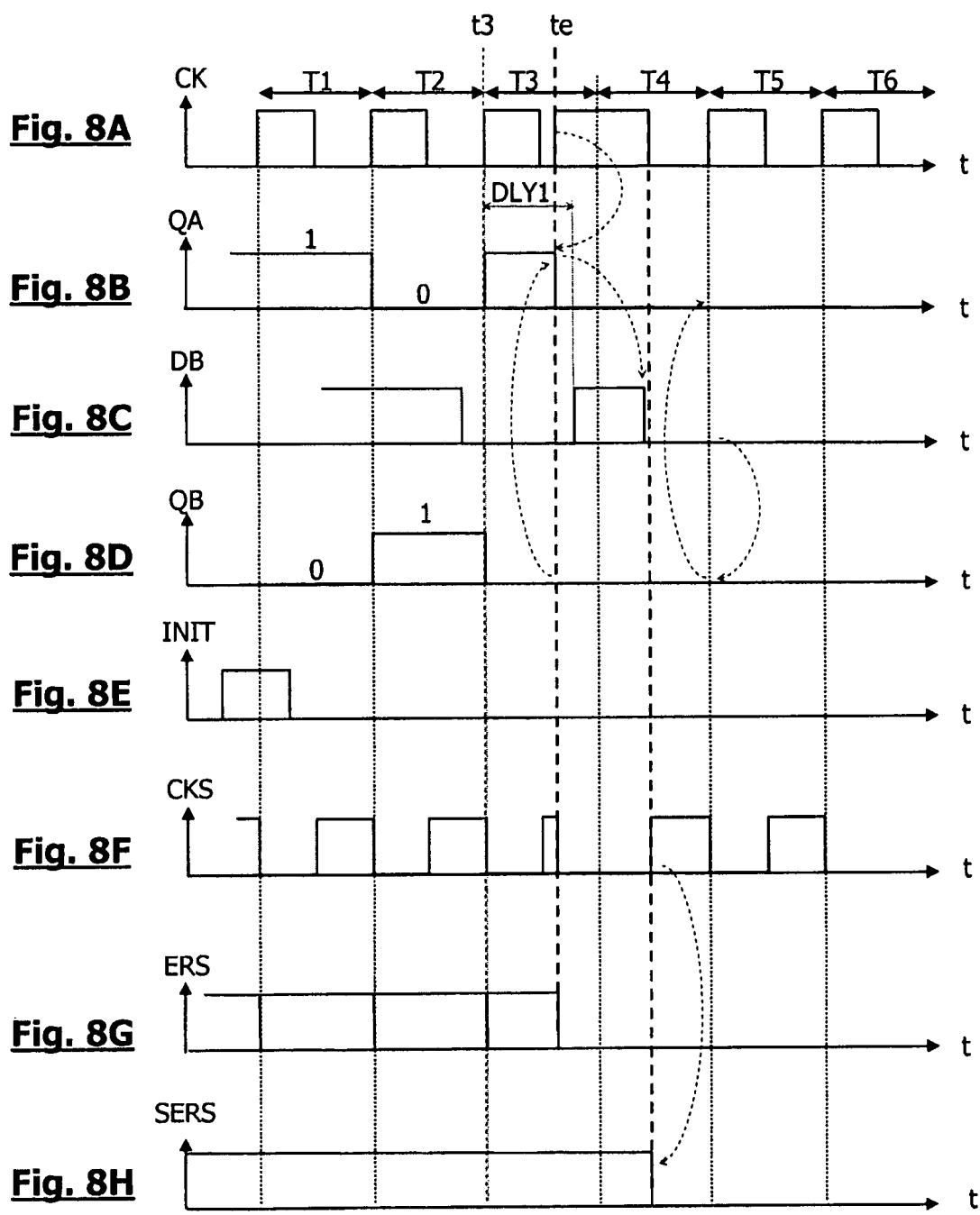

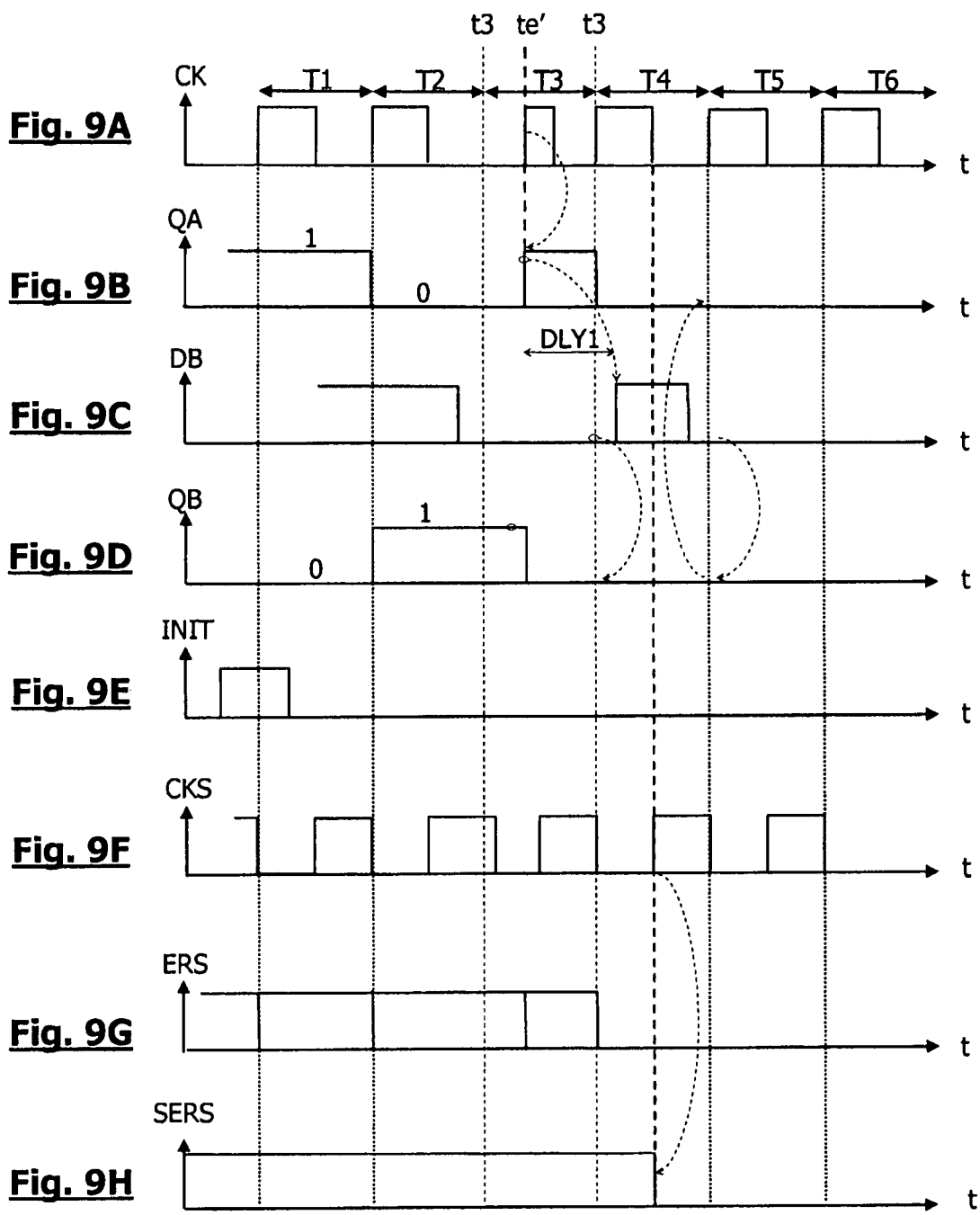

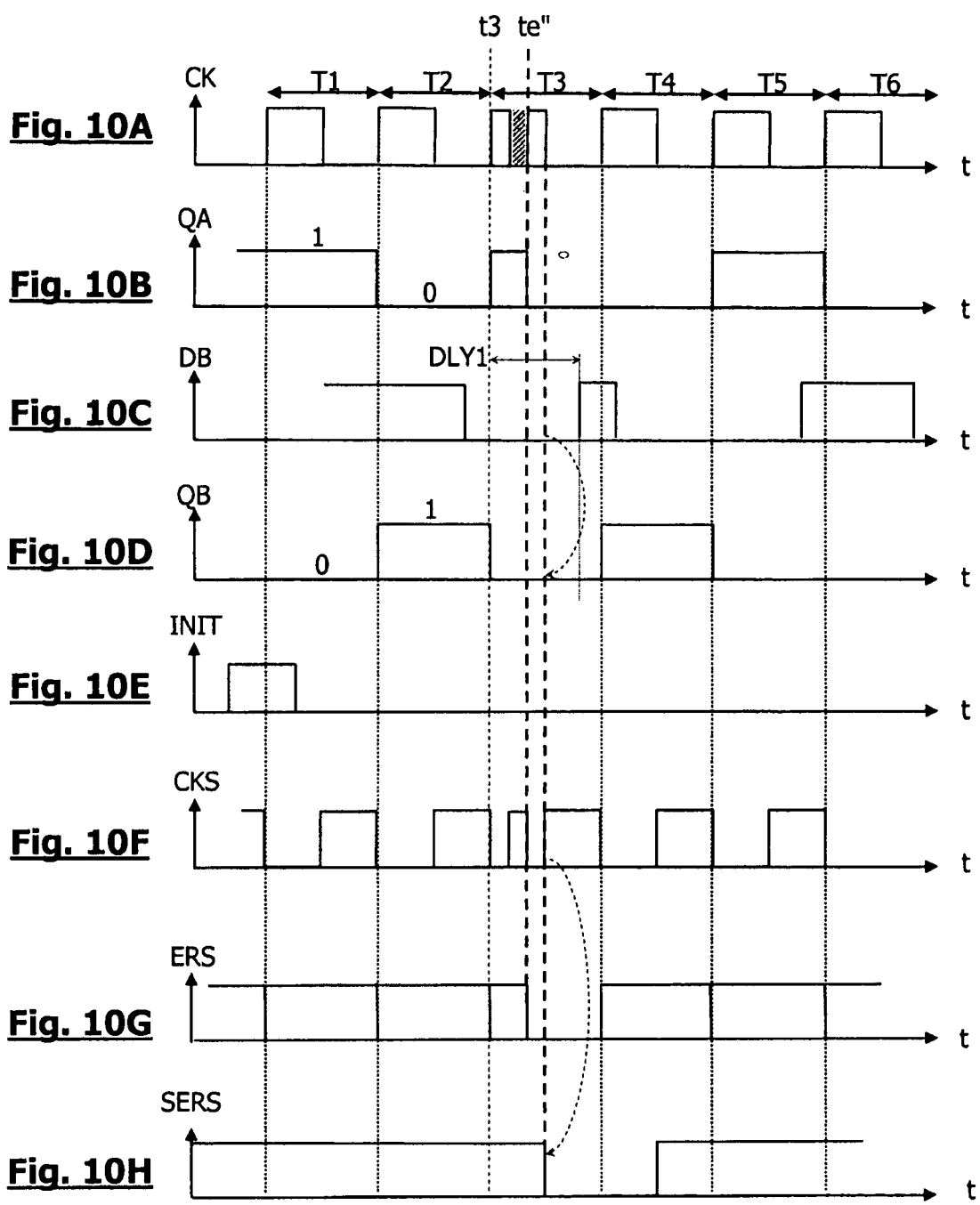

METHOD AND DEVICE FOR CHECKING THE INTEGRITY OF A LOGIC SIGNAL, IN PARTICULAR A CLOCK SIGNAL

TECHNICAL FIELD

The present disclosure generally relates to a method and a device for checking the integrity of a logic signal, in particular but not exclusively a clock signal.

The present disclosure more particularly but not exclusively relates to a method and a device for detecting a parasitic acceleration of a logic signal expressed by a closeness beyond a closeness threshold of at least two variation edges of a determined type of the logic signal.

BACKGROUND INFORMATION

The logic circuits present in secured integrated circuits, like integrated circuits for chip cards, are subject to various attacks from defrauders who attempt to discover their structure and/or the secrets they comprise. They are for example encryption circuits of the types DES, AES, RSA . . . , microprocessors programmed to execute encryption algorithms, register banks comprising secret keys, etc.

At the present time, the most advanced hacking methods involve injecting errors in an integrated circuit during the execution of so-called sensitive operations, for example operations of authentication or operations of execution of an encryption algorithm.

Such attacks, called attacks by error injection or by fault injection, may occur during so-called sensitive phases of calculations, for example during phases of calculation of an identification code, or during the reading of an encryption key in a memory. They make it possible, in combination with mathematical models and from wrong results obtained intentionally thanks to perturbations, to define a secret element like an encryption key or a password, to deduce the structure of an encryption algorithm and/or the secret keys the algorithm uses, etc.

In particular, the localized attacks involve introducing perturbations into a determined point of the circuit, for example by using a laser beam or an X-ray beam. A localized attack may concern the supply voltage, a data path, or the clock signal of the integrated circuit.

FIG. 1 schematically shows a synchronous circuit SCT comprising four synchronous modules SM1, SM2, SM3, SM4 clocked by a clock signal CK. The synchronous modules SM1-SM4 are simplified in block form, each comprising a set of synchronous flip-flops FFi, and each receives the clock signal CK through conduction paths of various lengths forming a clock tree. Each synchronous module is also connected to one or more data paths DP that may be shared by other modules. At the time of designing the circuit SCT, the clock tree is balanced by means of delay circuits TBCT, for example buffers formed by inverting logic gates. The balance of the clock tree is made so that the variation edges of the clock signal CK are substantially in phase at the input of each module.

Due to its effect on data transitions in the various synchronous modules, the clock signal CK is particularly subject to error injections. This vulnerability resides in the fact that an attack may allow a datum to be transferred in flip-flops which inputs are connected to data paths with low propagation time whereas flip-flops which inputs are connected to data paths having a longer propagation time have not received the datum yet.

This problem is illustrated in FIG. 2 as well as by chronograms shown in FIGS. 3A to 3E. FIG. 2 shows some synchronous circuit present in any one of the synchronous modules SM1-SM4. The synchronous circuit comprises three flip-flops FF1, FF2, FF3 clocked by rising edges of the clock signal CK, which is shown in FIG. 3A. The synchronous circuit also comprises an asynchronous data path P1 linking the output of the flip-flop FF1 to the input of the flip-flop FF2, and an asynchronous data path P2 linking the output of the flip-flop FF1 to the input of the flip-flop FF3. Each data path P1, P2 conventionally comprises several asynchronous logic gates (not shown). Each data path P1, P2 thus has its own propagation time or delay, respectively DLYa, DLYb, in relation to the transmission, at the input of the corresponding flip-flop FF2, FF3, of a datum supplied by the flip-flop FF1.

When a datum DT is applied to the input of the flip-flop FF1, for example during a cycle T1 of the clock signal CK, the datum is copied out by the output of the flip-flop during a cycle T2 and then propagates to the inputs of the flip-flops FF2, FF3 to be copied out by the outputs of the flip-flops FF2, FF3 during a cycle T3. The propagation of the datum is shown in FIGS. 3B to 3E. The chronogram of FIG. 3B shows the datum DT(A) in a point "A" located at the input of the flip-flop FF1, the chronogram of FIG. 3C shows the datum DT(B) in a point "B" located at the output of the flip-flop FF1, the chronogram of FIG. 3D shows the datum DT(C) in a point "C" located at the input of the flip-flop FF2, and the chronogram of FIG. 3E shows the datum DT(D) in a point "D" located at the input of the flip-flop FF3.

The datum DT is supplied at the point B by the flip-flop FF1 at an instant t2 corresponding to the beginning of the cycle T2. It thus is at the point C at an instant $t2'=t2+DLYa$ and at the point D at an instant $t2''=t2+DLYb$. The instants t2' and t2" must imperatively be in the cycle T2 or, failing that, the datum may not be copied out by the flip-flops FF2 and FF3 at the beginning of the cycle T3.

In the light of this example, it appears that the longest propagation time of a datum, through an asynchronous path linking two synchronous elements, determines the maximum frequency of the clock signal, i.e., the minimum period T thereof, this rule being well-known to integrated circuits designers. It also appears that if a defrauder injects a parasitic clock edge into the clock signal at an instant between the instant t2' and t2", an error on the datum DT occurs in the synchronous circuit because the flip-flop FF2 copies out the datum whereas the flip-flop FF3 does not copy it out, since the datum has not arrived to its input yet.

The chronograms of FIGS. 4A to 4D show four types of attacks on the clock signal CK that may lead to an error of datum:

- injecting a positive square wave: in FIG. 4A, a parasitic positive square wave is injected into the clock signal at the instant te,
- advancing a clock edge: in FIG. 4B, the rising edge of the clock square wave of the cycle T4 appears in anticipation at the instant te during a cycle T3,
- delaying an edge: in FIG. 4C, the rising edge of the clock square wave CK of the cycle T3 appears late at an instant te' during the cycle T3, instead of appearing at an instant t3 at the beginning of this cycle, and
- injecting a negative square wave: in FIG. 4A, a parasitic negative square wave is injected in a clock square wave, which causes the division of the clock square wave into two different positive square waves, the second one appears at an instant te" of the cycle T3 and may be considered as a parasitic positive square wave.

Generally, these various attacks aim at bringing two active edges of the clock signal closer in order to cause the successive triggering of the synchronous circuit with a time interval inferior to the longest propagation time of a datum inside the circuit. Each case shown thus corresponds to an acceleration of the clock signal beyond a threshold of closeness of the square waves that may be tolerated, and to an operation frequency superior to the maximum operation frequency of the synchronous circuit.

To counter such attacks, the methods usually implemented involve detecting an anomaly in the data supplied by the synchronous circuits concerned. These methods rely for example on a software or hardware redundancy of the circuits likely to be attacked. The software redundancy involves recalculating by using a program the result supplied by a synchronous circuit, the redundant calculation being carried out by a microprocessor. In addition, the hardware redundancy involves reproducing in several exemplaries the "sensitive" parts of a synchronous circuit, and in comparing the results supplied by the redundant circuits, the majority result may be retained as reliable in the event of an inconsistency of results. Globally, these methods involve an important occupation of the available semi-conductor surface (hardware redundancy) or a noteworthy slowing down of the operation of the synchronous circuits (software redundancy).

BRIEF SUMMARY

One embodiment of the present invention offers a really different solution. Instead of detecting a data error subsequent to an error injection, which constitutes the second effect of the error injection, one embodiment of the invention offers to detect the first effect of the error injection, e.g., the apparition of an anomaly in the clock signal, that is the detection of an acceleration of the latter.

Thus, one embodiment of the invention provides a method for detecting an acceleration of a logic signal expressed by a closeness, beyond a closeness threshold, of at least two variation edges of a determined type of the logic signal, comprising providing at least a first control bit and a second control bit and giving an initial value to the first control bit and an initial value to the second control bit, at each edge of the determined type of the logic signal, inverting the value of the first control bit after a first delay and inverting the value of the second control bit after a second delay inferior to the first, and detecting an acceleration when the control bits do not have at the same time their respective initial values or their respective inverted initial values.

According to one embodiment, the method comprises producing an asynchronous error signal having an inactive value and an active value, and bringing the asynchronous error signal to the active value when the two control bits do not have at the same time their respective initial values or their respective inverted initial values, and sampling the asynchronous error signal after each variation edge of the determined type of the logic signal, in order to filter tolerated synchronization errors of the two control bits and to produce a synchronous error signal.

According to one embodiment, the method comprises cyclically refreshing the synchronous error signal in synchronization with variation edges of the logic signal of a type inverse to the determined type, falling or rising.

According to one embodiment, the method comprises providing at least a first synchronous flip-flop clocked by the logic signal and a second synchronous flip-flop clocked by the logic signal, loading the initial value of the first control bit into the first flip-flop and the initial value of the second control bit into the second flip-flop, and configuring the flip-flops so that at each edge of the determined type of the logic signal, the value of the first control bit inverts after the first delay and the value of the second control bit inverts after the second delay.

According to one embodiment, configuring the flip-flops comprises linking a data output of the first flip-flop to a data input of the second flip-flop through a delay circuit introducing the first delay, and linking or connecting a data output of the second flip-flop to a data input of the first flip-flop.

According to one embodiment, configuring the flip-flops comprises linking a data output of the first flip-flop to a data input of the second flip-flop through a delay circuit introducing the first delay, and linking or connecting a data output of the second flip-flop to a data input of the second flip-flop.

According to one embodiment, loading the control bits comprises initializing each flip-flop with a signal for setting the flip-flop to 0 or 1.

According to one embodiment, the logic signal is a clock signal.

According to one embodiment, the first delay is at least equal to a maximum delay of asynchronous propagation of a datum between two synchronous elements clocked by the clock signal.

According to one embodiment, the second delay is equal to zero.

One embodiment of the invention also relates to a device for detecting an acceleration of a logic signal, comprising at least a first synchronous flip-flop clocked by the logic signal, receiving a first control bit, and a second synchronous flip-flop clocked by the logic signal, receiving a second control bit, the flip-flops being arranged so that at each edge of the determined type of the logic signal, the value of the first control bit inverts after a first delay and the value of the second control bit inverts after a second delay, means for loading an initial value of the first control bit into the first flip-flop and an initial value of the second control bit into the second flip-flop, and means for supplying an error signal representative of an acceleration when the two bits do not have at the same time their respective initial values or their respective inverted initial values.

According to one embodiment, the means for detecting an acceleration comprise means for producing an asynchronous error signal having an inactive value and an active value, and bringing the asynchronous error signal to the active value when the two control bits do not have at the same time their respective initial values or their respective inverted initial values, and means for sampling the asynchronous error signal after each variation edge of the determined type of the logic signal, in order to filter tolerated synchronization errors of the two control bits and to produce a synchronous error signal.

According to one embodiment, the means for sampling the asynchronous error signal are arranged to cyclically refresh the synchronous error signal in synchronization with variation edges of the logic signal of a type inverse to the determined type, falling or rising.

According to one embodiment, a data output of the first flip-flop is linked to a data input of the second flip-flop through a delay circuit introducing the first delay, and a data output of the second flip-flop is linked to a data input of the second flip-flop.

According to one embodiment, a data output of the first flip-flop is linked to a data input of the first flip-flop through a delay circuit introducing the first delay, and a data output of the second flip-flop is linked to a data input of the second flip-flop.

According to one embodiment, each flip-flop comprises a reset or a set input receiving a control signal to load the initial value of the control bit into the flip-flop.

According to one embodiment, the device comprises an input supplying the logic signal to be monitored and connected to a clock wire of a synchronous circuit.

According to one embodiment, the first delay is at least equal to a maximum delay of asynchronous propagation of a datum between two synchronous elements of the synchronous circuit.

According to one embodiment, the second delay is equal to zero.

One embodiment of the invention also relates to a synchronous circuit comprising synchronous modules clocked by a logic signal carried by a clock tree, comprising a detection device according to an embodiment of the invention, for detecting accelerations in the logic signal.

One embodiment of the invention also relates to an integrated circuit comprising synchronous elements clocked by a logic signal carried by a clock bus, comprising a detection device according to an embodiment of the invention, for detecting accelerations in the logic signal.

One embodiment of the present invention relates to the protection of synchronous circuits against attacks by injection of errors located in the clock signal.

BRIEF DESCRIPTION OF THE SEVERAL
VIEWS OF THE DRAWINGS

These and other features will be described in greater detail in the following description of various embodiments of a detection device according to the invention, in relation with, but not limited to the appended figures wherein:

FIG. 1 previously described schematically shows a synchronous circuit comprising a clock tree, FIG. 2 previously described shows a synchronous circuit comprising asynchronous data paths, FIG. 3A previously described shows a clock signal applied to the synchronous circuit and FIGS. 3B to 3E are chronograms showing the propagation of a datum in the synchronous circuit, FIGS. 4A to 4D previously described are chronograms showing four types of error injection leading to an acceleration of the clock signal, FIG. 5 shows a first embodiment of a detection device according to the invention, receiving a logic signal to be monitored, FIGS. 6A to 6H are example chronograms showing the normal operation of one embodiment of the detection device in the absence of error in the signal monitored, FIGS. 7A to 7H, 8A to 8H, 9A to 9H, 10A to 10H are example chronograms showing the operation of one embodiment of the detection device in response to an injection of an error of a first type, a second type, a third type and a fourth type, respectively, into the monitored signal, FIG. 11 shows a variation of the detection device of FIG. 5 according to one embodiment, FIG. 12 shows a second embodiment of the detection device according to the invention, and FIG. 13 shows the example architecture of an integrated circuit comprising a detection device according to one embodiment of the invention.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

In the examples that are described herein throughout this present application, it is considered that the edges of variation of the clock signal causing the triggering of the synchronous elements of a synchronous circuit, or active edges, are rising edges. However, an inverse convention can be adopted. In that case, what is indicated in the present application about rising edges relates to falling edges.

FIG. 5 shows a first embodiment of a detection device DCT1 according to the invention, comprising a shift register SREG1 and a watch circuit WCT. The device DCT1 receives a logic signal to monitor and is designed to detect a possible acceleration of this signal, expressed by a closeness of two rising edges beyond a tolerated closeness threshold. In relation with the technical problem described in the background, this signal is here the clock signal CK applied to a synchronous circuit like the one shown in FIGS. 1 and 2. The device DCT1 is in this case integrated near the synchronous circuit, as a securization accessory thereof.

The register SREG1 comprises two flip-flops FFA, FFB, each flip-flop comprising a data input D, a data output Q, an inverting data output /Q, a clock input CK, a set input SET and a reset input RST. The flip-flops FFA, FFB receive the clock signal CK on their clock input. The output Q of the flip-flop FFA supplies a control bit QA and is linked to the input D of the flip-flop FFB through a circuit DLG1 introducing between the output Q and the input D a delay DLY1 which duration is inferior to the period T of the clock signal CK. The output Q of the flip-flop FFB supplies a control bit QB and is connected to the input D of the flip-flop FFA. A signal INIT is applied to the input SET of the flip-flop FFA and to the input RST of the flip-flop FFB.

The watch circuit WCT comprises a gate XOR1 of EXCLUSIVE OR type, an inverting gate IV1 and a flip-flop FFC. The gate XOR1 receives the control bits QA, QB and supplies an asynchronous error signal ERS which active value is here 0. The inverting gate IV1 receives the clock signal CK and supplies a sampling signal CKS. The signal CKS is applied to the clock input of the flip-flop FFC which receives the signal ERS on the input D thereof and copies it out on the output at each rising edge of the signal CKS, to supply a synchronous error signal SERS which active value is 0 as well.

The shift register SREG1 has shift cycles T1, T2, T3, T4, T5, ... of period equal to the period T of the clock signal CK. When the signal INIT is applied to the flip-flops, for example a rising edge of the signal INIT, a control word comprising control bits QA, QB, respectively equal to 1 and 0 is loaded into the shift register. The bits QA, QB of the control word then propagate in closed loop in the register, so that the value supplied by the register is equal to 10, then 01, then 10 again, etc., as shown in the table below.

|  | QA | QB |
|---|---|---|
| INIT | 1 | 0 |
| Cycle T1 | 0 | 1 |
| Cycle T2 | 1 | 0 |
| Cycle T3 | 0 | 1 |
| Cycle T4 | 1 | 0 |
| ... | 0 | 1 |

When the register contains one of the values 10 or 01, the error signal ERS at the output of the gate XOR1 is equal to 1. If one of the combinations of control bits becomes equal to "00" or "11", the signal ERS switches to 0. If the error persists and still exists when the signal CKS has a rising edge, the signal SERS also switches to 0 thus indicating that acceleration has occurred in the clock signal CK. Such an error is representative of an error injection in the clock signal.

The operation of one embodiment of the device DCT1 during cycles T1, T2, T3, T4 . . . of the clock signal is illustrated by example chronograms in FIGS. 6A to 6H, 7A to 7H, 8A to 8H, 9A to 9H, and 10A to 10H, wherein:

FIGS. 6A to 10A show the clock signal CK,

FIGS. 6B to 10B show the control bit QA,

FIGS. 6C to 10C show a bit DB present at the input D of the flip-flop FFA,

FIGS. 6D to 10D show the control bit QB,

FIGS. 6E to 10E show the signal INIT,

FIGS. 6F to 10F show the sampling signal CKS,

FIGS. 6G to 10G show the asynchronous error signal ERS, and

FIGS. 6H to 10H show the synchronous error signal SERS.

Figure 1:
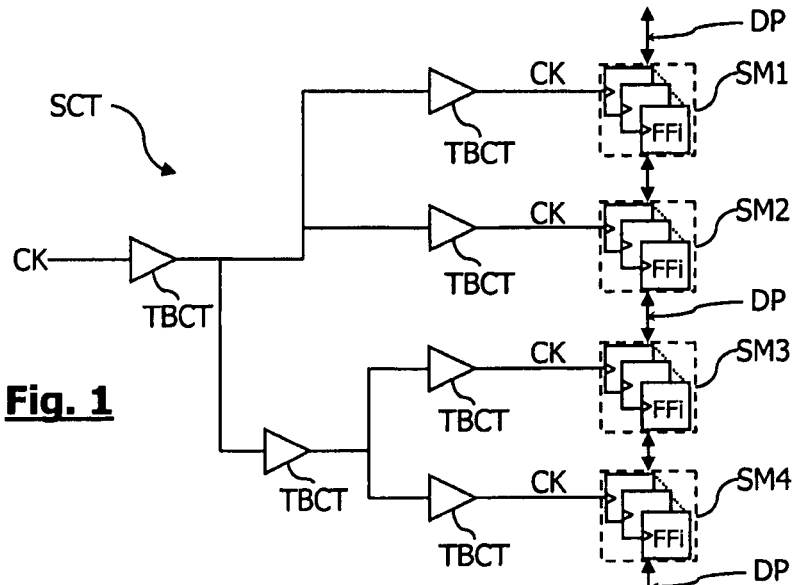
Figure 2:
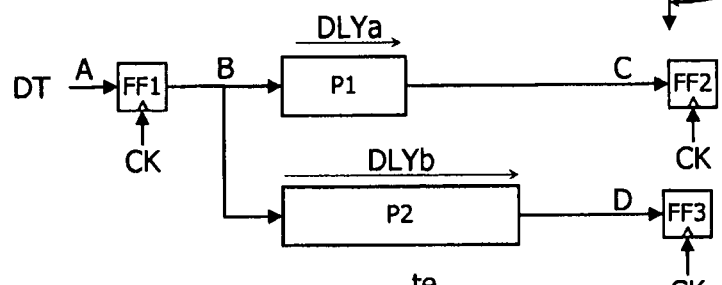
Figure 3A:
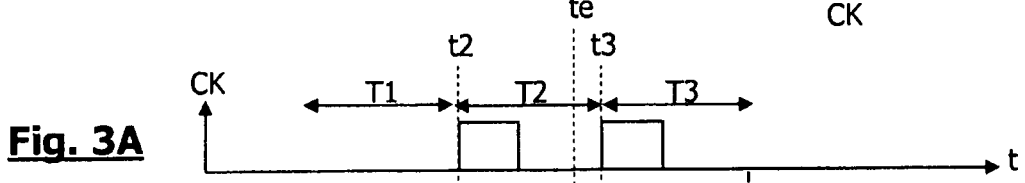
Figure 3B:
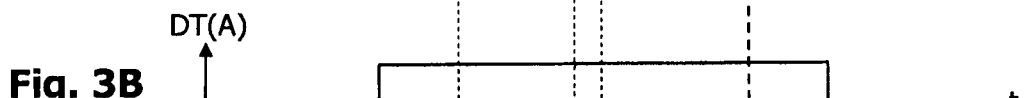
Figure 3C:
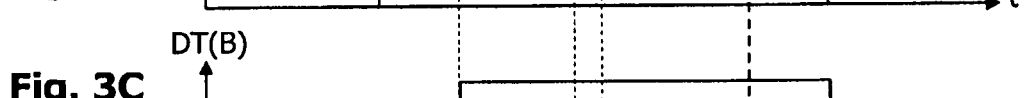
Figure 3D:
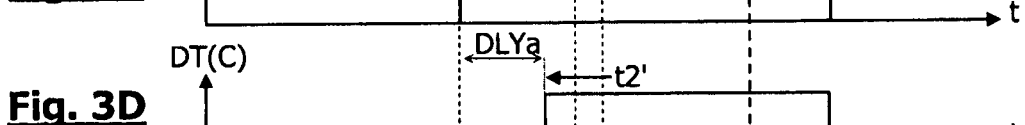
Figure 3E:
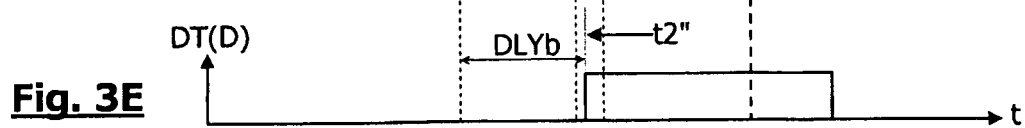
Figure 7A:
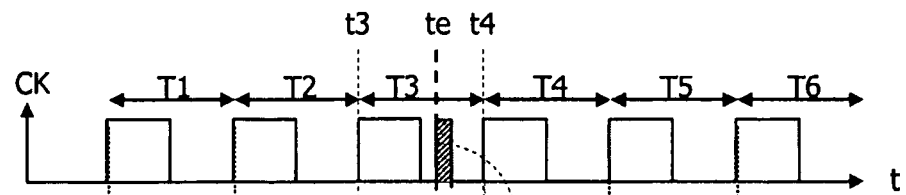
Figure 7B:
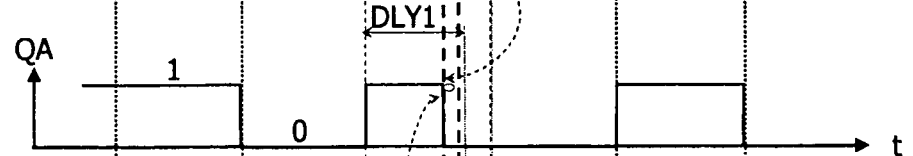
Figure 7C:
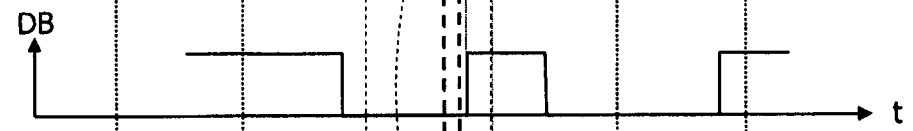
Figure 7D:
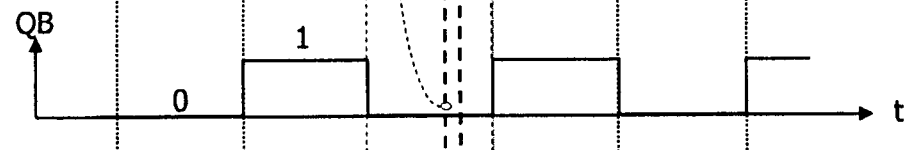
Figure 7E:
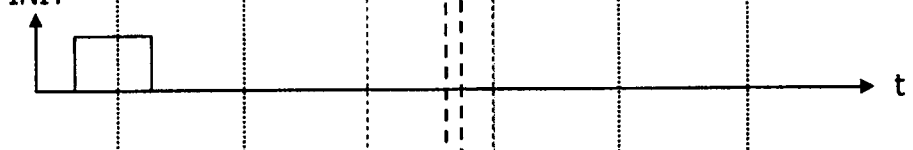
Figure 7F:
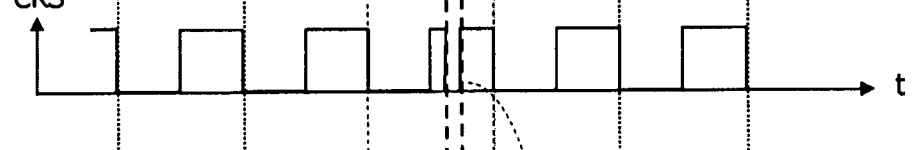
Figure 7G:
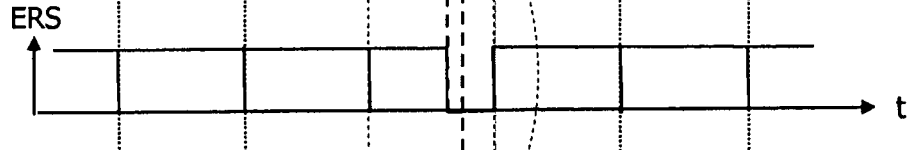
Figure 7H:
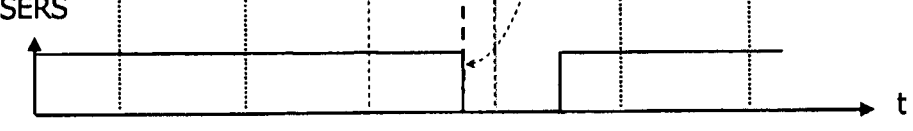

FIGS. 6A to 6H show the normal operation of one embodiment of the device DCT1 in the absence of synchronization error. The control word 10 is loaded into the device before the cycle T1 by the signal INIT. The control bits QA, QB alternate from 1 to 0 or from 0 to 1 at each rising edge of the signal CK so that the register alternately contains the values 1010 and 0101. The delay DLY1 as shown is around the period T of the clock signal but is inferior thereto, so that the bit DB, which copies out the control bit QA with the delay DLY1, has the right value when the following rising edge of the signal CK appears. Thus, the control bit QB, which copies out the bit DB when the following rising edge of the signal CK appears, has the right value (value of QA of the previous cycle).

The asynchronous error signal ERS may transitorily switch to 0 (or tend to 0) at each rising edge of the signal CK due to respective switching times of flip-flops, which may be slightly different. This short length fluctuation is not reproduced by the signal SERS and is thus filtered. Indeed, the synchronous error signal SERS is refreshed at each rising edge of the signal CKS, which here corresponds to a falling edge of the signal CK (inverting gate IV1), i.e., ½ clock cycle after the beginning of each clock cycle if the signal CK has a duty cycle equal to 0.5.

The response of one embodiment of the circuit DCT1 to the four aforementioned types of error injection is shown in FIGS. 7A to 10H.

In the example shown in FIGS. 7A to 7H, a positive parasitic square wave is injected in the signal CK at an instant te of the cycle T3, after the emission of the clock square wave of the cycle T3. The parasitic positive square wave causes the control bit QA to early switch to 0 whereas the control bit QB remains equal to 0 because the bit DB has not switched to 1 yet due to the delay DLY1. The asynchronous error signal ERS thus switches to 0. The synchronous error signal SERS switches to 0 when the parasitic square wave disappears (rising edge of the sampling signal CKS). At the beginning of the cycle T4 the control bit QB switches to 1 because the bit DB is equal to 1 due to the delay DLY1. The error signal ERS switches to 1 and the signal SERS switches to 1 at the half-cycle T4 (following rising edge of the sampling signal CKS) so that the detection device switches back to a "no-error" state.

The switching to 0 of the synchronous error signal SERS being transitory, it must be detected and processed in real time by an associated protection circuit, or by an interrupt control routine, as described below, in order to cause an immediate reaction aiming at the protection of the synchronous circuit being monitored or of the elements it controls.

In the example shown in FIGS. 8A to 8H, the rising edge of the clock square wave CK of the cycle T4 appears at an instant te of the cycle T3 instead of appearing at an instant t4 corresponding to the beginning of the cycle T4. The apparition of the rising edge at the instant te triggers a chain of errors on the two control bits. The control bit QA switches to 0 because the control bit QB is equal to 0 and the control bit QB remains equal to 0 because the bit DB has not switched to 1 yet due to the delay DLY1. The asynchronous error signal ERS thus switches to 0. In the middle of the cycle T4, the signal CKS has a falling edge and the synchronous error signal SERS switches to 0. At the beginning of the cycle T5, the control bit QB remains equal to 0 because the bit DB has switched to 0 in the meantime. The control bit QA remains to 0 because the control bit QB is equal to 0. The two control bits are thus definitely equal to 0 until a new application of the signal INIT.

In the example shown in FIGS. 9A to 9H, the rising edge of the clock square wave CK of the cycle T3 is delayed and appears at an instant te' of the cycle T3 instead of appearing at an instant t3 corresponding to the beginning of the cycle T3. The delayed apparition of the rising edge also triggers a chain of errors on the two control bits. The control bit QA switches to 1 because the control bit QB is equal to 0. The bit QB switches to 0 because the bit DB has not yet switched to 1 due to the delay DLY1. The error has not been detected yet. However, at the beginning of the cycle T4, the control bit QA switches to 0 because the control bit QB is equal to 0. Simultaneously the control bit QB remains equal to 0 because the bit DB has not switched to 1 yet due to the delay DLY1. The synchronous error signal SERS thus switches to 0. In the middle of the cycle T4, the signal CKS has a falling edge and the asynchronous error signal ERS switches to 0. The two control bits are definitely equal to 0 until a new application of the signal INIT.

In the example shown in FIGS. 10A to 10H, a negative parasitic square wave is injected in the clock square wave CK during the cycle T3. The negative square wave triggers the division of the clock square wave into two different positive square waves, the second appearing at an instant te" of the cycle T3 and forming a parasitic positive square wave. This parasite positive square wave produces an effect similar to that of the parasitic square wave of FIG. 7A. It causes the control bit QA to early switch to 0 whereas the control bit QB remains equal to 0 because the bit DB has not switched to 1 yet. The asynchronous error signal ERS thus switches to 0. The synchronous error signal SERS switches to 0 when the parasitic square wave disappears (rising edge of the sampling signal CKS). At the beginning of the cycle T4 the control bit QB switches to 1 because the bit DB is equal to 1 due to the delay DLY1. The error signal ERS switches to 1 and the signal SERS switches to 1 at the half-cycle T4 (following rising edge of the sampling signal CKS) so that the detection device switches back to a "no-error" state.

It emerges from these chronograms that the delay DLY1 determines a threshold of detection of a closeness of the clock edges and thus determines the sensitivity of the detection device to the accelerations of the clock signal CK. If the delay DLY1 is small in relation to the period T of the clock signal, some acceleration will not be detected. In practice, and within the frame of the application of one embodiment of the invention to the monitoring of the clock signal of a synchronous circuit, the delay DLY1 is equal to the longest propagation time of a datum in the synchronous circuit. As indicated above, this longest propagation time is the longest propagation time of a datum through an asynchronous path linking two synchronous elements.

The detection device according to an embodiment of the invention is susceptible of various variations and embodiments.

Figure 11:
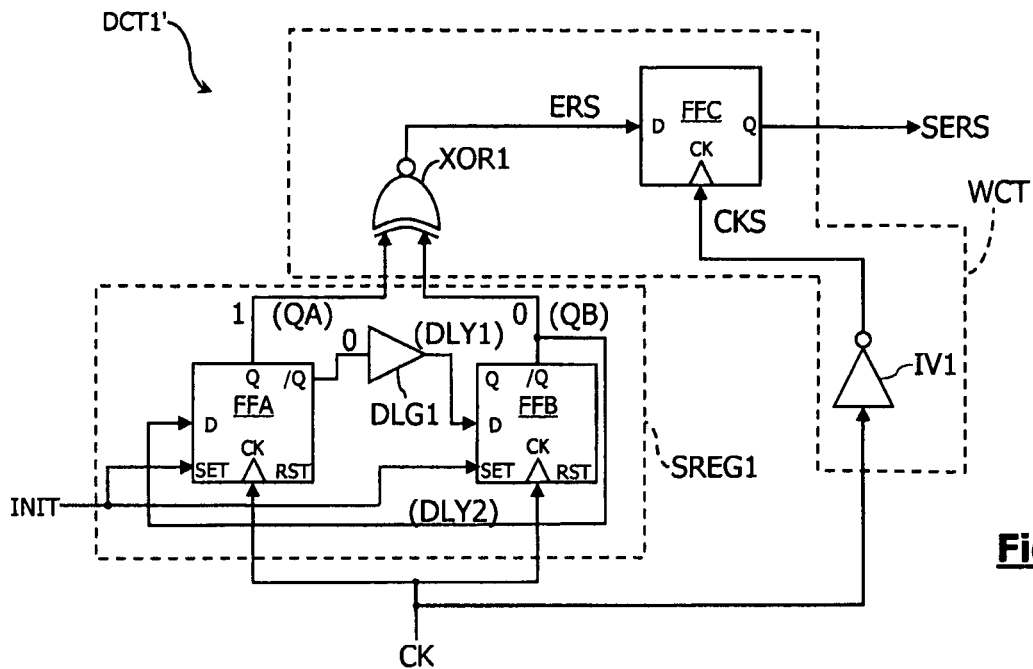

FIG. 11 shows a variation of the detection device DCT1' wherein the inverting output /Q of the flip-flop FFA is linked to the input D of the flip-flop FFB through the delay circuit DLG1, whereas the control bit QA is supplied by the output Q of the flip-flop FFA. The inverting output /Q of the flip-flop FFB is connected to the input D of the flip-flop FFA and supplies the control bit QB. The signal INIT is applied to the inputs SET of each flip-flop.

Other variations of this type may be provided, for example by applying the signal INIT to the inputs RST of each flip-flop.

Figure 12:
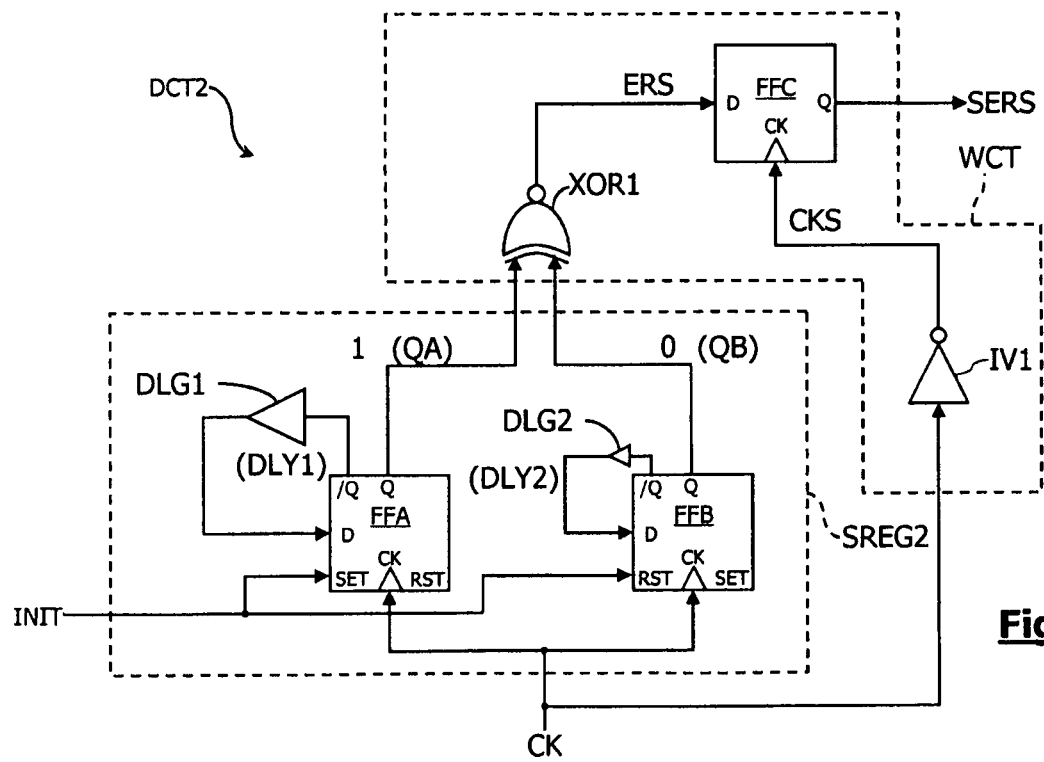

FIG. 12 shows a second embodiment of the detection device DCT2. The detection circuit DCT2 comprises a watch circuit WCT identical to that of the device DCT1 and a shift register SREG2. Although named "shift register", the register SREG2 is not a shift register strictly speaking because the inputs and outputs of the flip-flops FFA and FFB are not interconnected. Thus, the flip-flop FFA supplies the control bit QA to its output Q whereas its inverting output /Q is connected to its input D through the delay circuit DLG1. The flip-flop FFB supplies the control bit QB to its output Q whereas its inverting output /Q is connected to its input D through a delay circuit DLG2 having a low and negligible delay DLY2. As previously, each flip-flop receives the clock signal CK on its clock input and the signal INIT on its input SET and RST, respectively.

The circuit DLG2 is provided to avoid a self-oscillation of the flip-flop FFB during the switching periods, because of the loop connection of the output /Q thereof to the input D. According to the structure of the flip-flop FFB and the switching time thereof, the circuit DLG2 may not be necessary. In that case the delay DLY2 is equal to 0.

Although decoupled, the flip-flops FFA, FFB operate in a substantially similar way to that described above, the couple of control bits QA and QB alternately switching from the value 01 to the value 10 and from the value 10 to the value 01 and having an erroneous value 00 or 11 in the event of an acceleration of the clock signal.

In addition, due to the decoupling of control bits QA, QB, the initial value of the control word is not necessarily 01 or 10. The initial value may be 11 or 00. In this case the gate XOR1 in the watch circuit WCT is replaced by a NON EXCLUSIVE OR gate in order to detect the couples of value 01 and 10 as representative of a forbidden acceleration of the clock signal. It appears however, after a preliminary study, that the "00" or "11" configuration of the control word may not allow some attacks to be detected. The best embodiment of the invention thus seems to be the one using inverse values "01" or "10" of the control word.

The detection device is susceptible of various other variations and embodiments. Thus, although it has been described above some embodiments wherein the number of flip-flops of the shift register is reduced to the minimum, this number of flip-flops may conversely be maximal if no dimension requirement is imposed to the designer. The shift register according to one embodiment of the invention may comprise redundant flip-flops, for example a chain of four flip-flops receiving at the initialization control bits equal to 0101 and forming a control word which successive values are 0101 and 1010.

In addition, the use of synchronous flip-flops of the type described above is not essential for the implementation of one embodiment of the invention. The shift register may for example be made from a volatile memory (RAM memory) controlled by a logical circuit clocked by the clock signal to be monitored which makes the bits of the control word pass through one memory cell to the other at each clock cycle (with application of the delay DLY1 to the transition of one control bit out of two), or which inverts the value of each control bit at each clock cycle (applying the delay DLY1 at the inversion of one control bit out of two).

One embodiment of the present invention is also susceptible of various applications. In FIG. 1, the conventional schematic representation of the synchronous modules SM1-SM4 refers to any type of synchronous circuit like a microprocessor or an element of microprocessor, a circuit of cryptographic calculation or a part of such a circuit, an address decoding circuit, a circuit for reading a memory or a part of such a circuit, etc.

Figure 13:
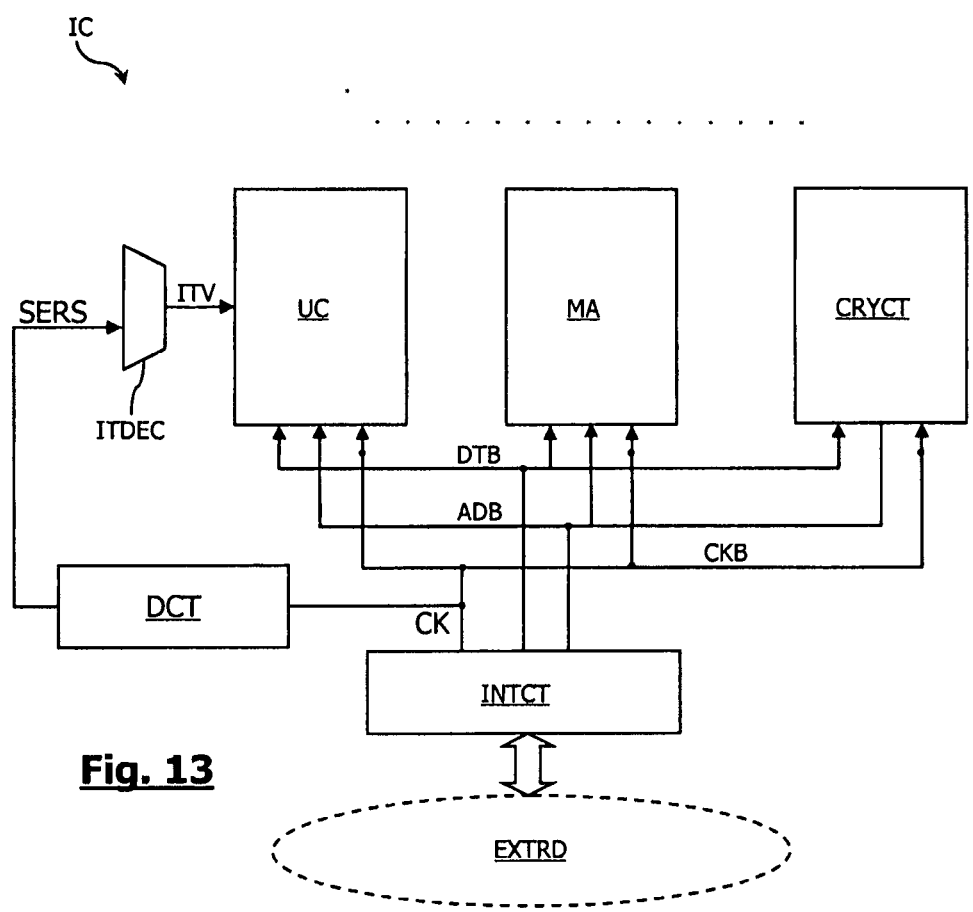

FIG. 13 shows an example of application of one embodiment of the invention to an integrated circuit IC for chipcard or electronic tag. The integrated circuit IC comprises a microprocessor central unit UC, a memory array MA comprising areas of volatile memory (RAM) and areas of non-volatile memory (ROM, EEPROM, FLASH . . . ), an encryption circuit CRYCT allowing the integrated circuit to authenticate during a transaction, and an interface circuit INTCT allowing it to communicate with external chipcard or electronic tag readers (EXTRD). The interface circuit INTCT may be of the contact type and comprise for example ISO 7816 contacts (clock, data, supply, ground, etc contacts). The interface circuit INTCT may also be of the contactless RFID type (Radio Frequency Identification) and comprise an antenna coil RF or an antenna circuit UHF, circuits for modulating and demodulating outgoing and incoming data, a clock extractor circuit, etc. The central unit UC, the memory array MA and the circuit CRYCT are linked by a data bus DTB, an address bus ADB and a clock bus CKB carrying a clock signal CK. In such an application, the source of the clock signal CK is usually located in the interface circuit (ISO 7816 contact supplying the clock signal or circuit extracting the clock signal from a carrier RF or UHF) but may also be embedded into the integrated circuit if the latter has an autonomous supply of electric energy (battery). The clock tree is here formed by the branching of the clock bus as well the branching internal to each element UC, MA, CRYCT which are not shown.

The integrated circuit is equipped with a circuit DCT according to one embodiment of the invention, providing the detection of accelerations of the clock signal CK. The circuit DCT receives for example the signal CK taken from the output of the circuit INTCT. The circuit DCT supplies the synchronous error signal SERS which is sent to the central unit to take urgency measures in response to the signal SERS switching to the active value. These urgency measures may be executed by a wired-logic protection circuit specifically provided to that end, which may for example cause a hardware reset of the central unit, an erasure, a destruction or a lock of some parts of the memory array, etc. The urgency measures may also be processed by the central unit by switching it to a dedicated sub-program. In that case, and as shown, the error signal SERS is applied to an interruption decoder ITDEC which supplies to the central unit UC an interruption vector ITV when the error signal SERS has the active value.

One embodiment of the present invention is also susceptible of various applications other than monitoring a clock signal and may be generally applied to monitoring the integrity of any type of logic signal, periodic or not. For example, when data are sent to several elements through a data tree, a detection device according to one embodiment of the invention may be used to detect a data corruption in the data tree by injection of a positive or negative square wave, delay or advance of an edge.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method for detecting an acceleration of a logic signal expressed by a closeness, beyond a closeness threshold, of at least two variation edges of a first type of the logic signal, rising or falling, the method comprising:
   providing at least a first control bit and a second control bit and giving an initial value to the first control bit and an initial value to the second control bit;
   at each edge of the first type of the logic signal, inverting a value of the first control bit after a first delay and inverting a value of the second control bit after a second delay inferior to the first delay; and
   detecting an acceleration when the control bits do not have at a same time their respective initial values or their respective inverted initial values.

2. The method according to claim 1, further comprising:
   producing an asynchronous error signal having an inactive value and an active value, and bringing the asynchronous error signal to the active value when the two control bits do not have at the same time their respective initial values or their respective inverted initial values; and
   sampling the asynchronous error signal after each variation edge of the first type of the logic signal, in order to filter tolerated synchronization errors of the two control bits and to produce a synchronous error signal.

3. The method according to claim 2, further comprising cyclically refreshing the synchronous error signal in synchronization with variation edges of the logic signal of a second type inverse to the first type, falling or rising.

4. The method according to claim 1, further comprising:
   providing at least a first synchronous flip-flop clocked by the logic signal and a second synchronous flip-flop clocked by the logic signal;
   loading the initial value of the first control bit into the first flip-flop and the initial value of the second control bit into the second flip-flop; and
   configuring the flip-flops so that at each edge of the first type of the logic signal, the value of the first control bit inverts after the first delay and the value of the second control bit inverts after the second delay.

5. The method according to claim 4 wherein configuring the flip-flops includes:
   linking a data output of the first flip-flop to a data input of the second flip-flop through a delay circuit introducing the first delay; and
   linking or coupling a data output of the second flip-flop to a data input of the first flip-flop.

6. The method according to claim 4 wherein configuring the flip-flops includes:
   linking a data output of the first flip-flop to a data input of the first flip-flop through a delay circuit introducing the first delay; and
   linking or coupling a data output of the second flip-flop to a data input of the second flip-flop.

7. The method according to claim 5 wherein loading the control bits includes initializing each flip-flop with a signal for setting the flip-flop to 0 or 1.

8. The method according to claim 1 wherein the logic signal is a clock signal.

9. The method according to claim 8 wherein the first delay is at least equal to a maximum delay of asynchronous propagation of a datum between two synchronous elements clocked by the clock signal.

10. The method according to claim 1 wherein the second delay is equal to zero.

11. A device for detecting an acceleration of a logic signal, the device comprising:
   at least a first synchronous flip-flop configured to be clocked by the logic signal and adapted to receive a first control bit, and a second synchronous flip-flop clocked by the logic signal and adapted to receive a second control bit, the flip-flops being arranged so that at each edge of a first type of the logic signal, rising or falling, a value of the first control bit inverts after a first delay and a value of the second control bit inverts after a second delay;
   means for loading an initial value of the first control bit into the first flip-flop and an initial value of the second control bit into the second flip-flop; and
   means for supplying an error signal representative of the acceleration when the two bits do not have at a same time their respective initial values or their respective inverted initial values.

12. The device according to claim 11, wherein the means for supplying the error signal includes:
   means for producing an asynchronous error signal having an inactive value and an active value, and bringing the asynchronous error signal to the active value when the two control bits do not have at the same time their respective initial values or their respective inverted initial values; and
   means for sampling the asynchronous error signal after each variation edge of the first type of the logic signal, in order to filter tolerated synchronization errors of the two control bits and to produce a synchronous error signal.

13. The device according to claim 12 wherein the means for sampling the asynchronous error signal are arranged to cyclically refresh the synchronous error signal in synchronization with variation edges of the logic signal of a second type inverse to the first type, falling or rising.

14. The device according to claim 11 wherein:
a data output of the first flip-flop is linked to a data input of the second flip-flop through a delay circuit introducing the first delay; and
a data output of the second flip-flop is linked to a data input of the first flip-flop.

15. The device according to claim 11 wherein:
a data output of the first flip-flop is linked to a data input of the first flip-flop through a delay circuit configured to introduce the first delay; and
a data output of the second flip-flop is linked to a data input of the second flip-flop.

16. The device according to claim 14 wherein each flip-flop includes a reset or a set input adapted to receive a control signal to load the initial value of the control bit into the flip-flop.

17. The device according to claim 11, further comprising an input adapted to supply the logic signal to be monitored and coupled to a clock wire of a synchronous circuit.

18. The device according to claim 17 wherein the first delay is at least equal to a maximum delay of asynchronous propagation of a datum between two synchronous elements of the synchronous circuit.

19. The device according to claim 11 wherein the second delay is equal to zero.

20. A synchronous circuit, comprising:
synchronous modules configured to be clocked by a logic signal carried by a clock tree; and
a detection device adapted to detect a timing variation in the logic signal, said timing variation representing a time interval less than a longest propagation time of a datum inside at least one of said synchronous modules, said detection device including:
at least a first flip-flop configured to be clocked by the logic signal and adapted to receive a first control bit;
a second flip-flop configured to be clocked by the logic signal and adapted to receive a second control bit, the first and second flip-flops being arranged so that at each edge of the logic signal, a value of the first control bit inverts after a first delay and a value of the second control bit inverts after a second delay;
a first circuit block coupled to the first flip-flop and adapted to load an initial value of the first control bit into the first flip-flop, and coupled to the second flip-flop and adapted to load an initial value of the second control bit into the second flip-flop; and
a second circuit block coupled to the first and second flip-flops and adapted to supply an error signal representative of the timing variation if the control bits do not have at a same time their respective initial values or their respective inverted initial values.

21. The circuit of claim 20 wherein said synchronous modules and said detection device are part of an integrated circuit card.

22. The circuit of claim 20 wherein said synchronous modules include a processor, a memory, an encryption circuit, and an interface circuit.

23. The circuit of claim 20 wherein the second delay is equal to zero.

24. The circuit of claim 20 wherein said second circuit block includes:
a logic gate having input terminals coupled to said first and second flip-flops to respectively receive values of said control bits, and having an output terminal to provide said error signal; and
a third flip-flop having a first terminal coupled to said output terminal of said logic gate to receive said error signal, a second terminal to receive said clock signal inverted, and a third terminal to provide a synchronous error signal.

25. The circuit of claim 20 wherein a data output of the first flip-flop is coupled to a data input of the second flip-flop through a delay circuit adapted to introduce the first delay, and wherein a data output of the second flip-flop is coupled to a data input of the first flip-flop.

26. The circuit of claim 20 wherein a data output of the first flip-flop is coupled to a data input of the first flip-flop through a delay circuit adapted to introduce the first delay, and wherein a data output of the second flip-flop is coupled to a data input of the second flip-flop.

* * * * *